(No Model.)
G. GEDDES.
TWO WHEELED VEHICLE.
No. 409,321. Patented Aug. 20, 1889.
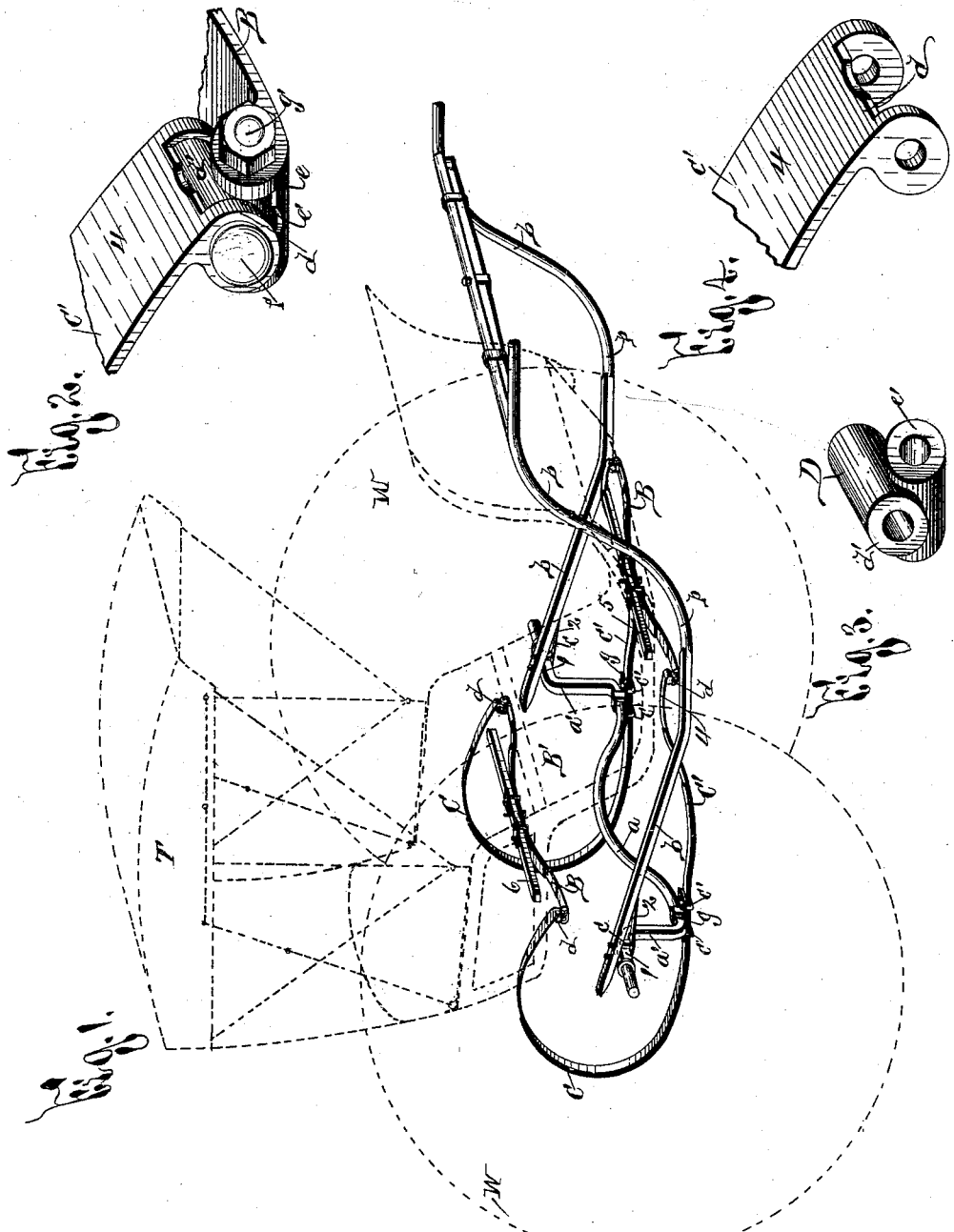
WITNESSES:
INVENTOR
George Geddes
BY
ATTORNEYS.

UNITED STATES PATENT OFFICE.

GEORGE GEDDES, OF FAIR MOUNT, ASSIGNOR TO CULVER GILMAN THYNG, OF OLEAN, NEW YORK.

TWO-WHEELED VEHICLE.

SPECIFICATION forming part of Letters Patent No. 409,321, dated August 20, 1889.

Application filed July 3, 1888. Serial No. 278,952. (No model.)

*To all whom it may concern:*

Be it known that I, GEORGE GEDDES, of Fair Mount, in the county of Onondaga, in the State of New York, have invented new and useful Improvements in Vehicles, of which the following, taken in connection with the accompanying drawings, is a full, clear, and exact description.

My invention relates to improvements in the class of vehicles termed "carts," and has for its object the production of a simply-constructed two-wheeled vehicle, in which the horse motion is entirely obviated, while at the same time an easy-riding, easily-accessible vehicle is produced at a minimum expense of manufacture, providing great strength and durability; and to this end my invention consists, essentially, in the detail construction and arrangement of the parts, all as hereinafter more particularly described, and pointed out in the claims.

In specifying my invention reference is had to the accompanying drawings, forming a part of this specification, in which like letters indicate corresponding parts in all the views.

Figure 1 is an isometric view of my improved cart, the full lines illustrating specifically the novel portions of my invention, while the dotted lines represent the usual body, wheels, and top of what is commonly known as a "doctor's" gig or cart. Fig. 2 is an enlarged detached detail of the compound universal knuckle-joint securing the ends of the side and cross springs of my improved vehicle. Fig. 3 is an enlarged detached view of the joint of the shackle employed in joining or connecting the ends of the springs with the compound universal knuckle-joint illustrated in Fig. 2; and Fig. 4 illustrates the knuckle formed on the end of the spring, the same forming a joint in connection with the shackle illustrated in Fig. 3.

$a$ represents the axle of my improved cart, shaped, preferably, as shown in Fig. 1—that is, with the arched or curved transverse portion and the cranked arms $a'$ and angular bends $l\ l$ extending outwardly from the cranks, as shown. The object of shaping the axle in this peculiar manner is for the purpose of bringing the body of the cart as low down as possible in order to make it easily accessible to get in and out, and I secure this desirable feature in my invention by cranking the axle in the manner described and shown in connection with bending the shafts $b\ b$ with considerable curve at the point $p$, Fig. 1, and connecting the shafts to the axle by the clips $c$, as shown in Fig. 1.

In order to prevent the shafts from swaying on the clip $c$, I provide the extended brace 2, which projects forwardly from the clip $c$ on the axle, and has its outer end secured firmly to the shaft $b$.

The vehicle-body B' (shown by the dotted lines) is hung upon the combined C and side springs C C', the said combined spring C C' being connected at its opposite ends with semi-elliptic cross-springs B B, which come under the bolsters 5 6 and serve to form the spring-support for the vehicle-body, as aforesaid. The combined C and side springs C C' are connected to the axle by clips $c'$, which are secured to clasp-plates $g$, affording a broad and secure fastening for the spring to the axle, and the ends of the combined C-spring and side springs C C' are connected to the cross-springs B B by means of the compound universal knuckle-joint D. (Best shown in the enlarged detached views, Figs. 2 and 3.)

It will be observed upon reference to Fig. 2 that the end 4 of the spring C' is provided with a knuckle $d$, and the knuckle $d$ slips over the portion $d'$ of the shackle D, where it is secured movably by the screw-bolt $f$, Fig. 2, upon which it may oscillate as a pivot, and the cross-spring B is provided with a corresponding knuckle $e$, which fits over the pivot-bearing $e'$ of the shackle D, and a screw-bolt $g'$ serves to secure the end of the spring to the shackle, as shown in Fig. 2.

It will be observed that by the construction and connection of the ends of the C and cross springs a compound universal knuckle-joint is produced, permitting the springs to move freely on the screw-bolts as pivots in two planes substantially at right angles to each other, and by this peculiarity of construction and movement of the springs I secure the much-desired result of overcoming the motion of the horse upon the cart-body, which has heretofore caused serious difficulty in the construction of this class of vehicles, and numerous devices have been made and patented to accomplish this same purpose, yet none of the same have gone to the extent in this direction in securing the result that I secure by my peculiar construction and arrangement of the parts and the connection of the springs.

It will be observed that by using the C-spring at the rear I am enabled to conform the hanging of the body to the peculiarity of its construction without elevating the cart-body so high from the ground as to make the same undesirable in consequence of the difficulty of getting in and out of the vehicle, while by extending the C-spring into a side spring at its forward end I conform the springs at the forward end of the vehicle to the peculiarity of construction of the platform of the body, and thereby secure not only ease in getting in and out of the vehicle, but at the same time a conformation of the various parts to the contour of the body, which makes the same pleasing in design, as well as of great utility in construction.

It will also be observed that in consequence of the sharp bend in the shafts $b\ b$ at $p$ the low-down feature of the vehicle is secured in its most desirable form.

By my invention I secure the shafts directly to the axle, securely bracing the same by means of the forwardly-extending braces 2, and thereby throw the motion of the horse on the shafts and axle instead of connecting the shaft to the body, as in most of the carts heretofore made and patented, and whatever horse motion is transmitted through the medium of the springs to the vehicle-body I compensate by the peculiar connection of the springs by means of the compound universal knuckle-joint, which I have previously described.

The vehicle is extremely simple in construction, very strong, and graceful in all of its proportions.

Having thus fully described my invention, what I claim as new, and desire to secure by Letters Patent, is—

1. In a two-wheel vehicle, the combination, with the body thereof, of the crank-arm axle, substantially as described, the front and rear cross-springs, and the side springs clipped to the drop part of the axle and having one end C-shaped and shackled loosely to a rear cross-spring secured to the body, and the other end slightly curved in an upward and downward direction and shackled loosely to a front cross-spring secured to said body, substantially as and for the purpose set forth.

2. In a two-wheel vehicle, the combination, with the body thereof, of the crank-arm axle, as described, the side springs $c'$, clipped to the drop part of the axle and having the rear end C-shaped and shackled loosely to a rear cross-spring secured to the body, and the forward end slightly curved in an upward and downward direction and shackled loosely to a front cross-spring, the drop-shafts clipped to the arm of the bent axle and braced thereto at a point above that where the side springs are clipped, and the braces for securing the shafts against lateral movement, substantially as shown and described.

In testimony whereof I have hereunto signed my name, in the presence of two attesting witnesses, at Syracuse, in the county of Onondaga, in the State of New York, this 30th day of June, 1888.

GEORGE GEDDES.

Witnesses:
FREDERICK H. GIBBS,
E. WEISBURG.